UNITED STATES PATENT OFFICE.

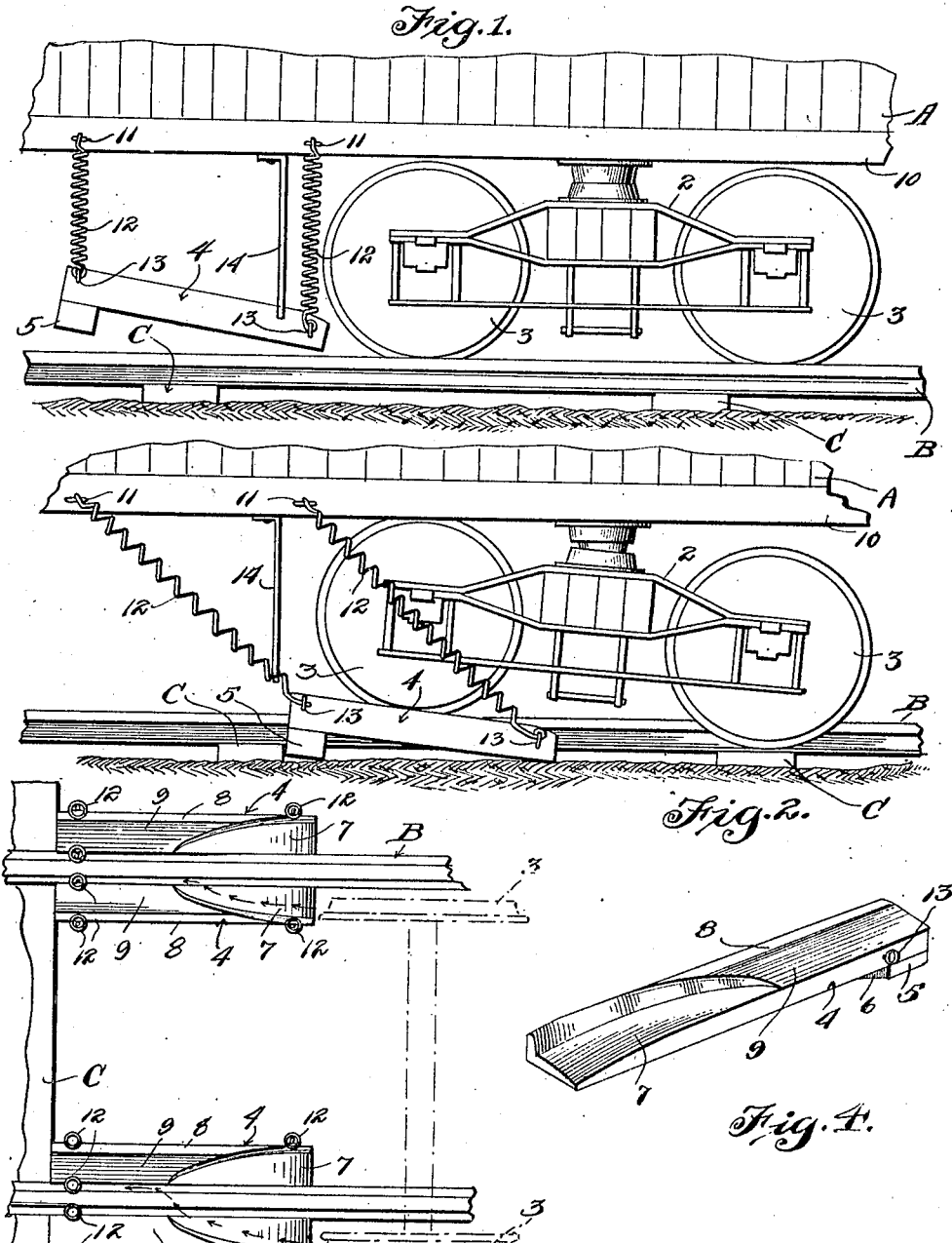

WILLIAM J. BALLARD, OF ST. JOSEPH, MISSOURI.

CAR-REPLACER.

1,298,275. Specification of Letters Patent. Patented Mar. 25, 1919.

Application filed January 5, 1916. Serial No. 70,507.

*To all whom it may concern:*

Be it known that I, WILLIAM J. BALLARD, a citizen of the United States, residing at St. Joseph, in the county of Buchanan, State of Missouri, have invented certain new and useful Improvements in Car-Replacers; and I do hereby declare the following to be a full, clear, and exact description of the invention, such as will enable others skilled in the art to which it appertains to make and use the same.

The invention relates to a car replacer, and more particularly to the class of automatically operated car replacers adapted for quickly replacing the wheels of a car on to the rails of a track, should the wheels become derailed.

The primary object of the invention is the provision of a car replacer of this character, supported in advance of each forward car wheel of a truck in such manner that should the wheels become derailed the replacers will be automatically positioned so that the wheels will run over them and on to the rails of the track.

Another object of the invention is the provision of means whereby the replacers will be brought automatically into operative position when the wheels leave the track.

A further object of the invention is the provision of a replacer of this character, which is comparatively simple in construction, permanently mounted upon a car to render said replacer strong, thoroughly reliable and efficient in operation and also one which is inexpensive to manufacture.

With these and other objects in view, this invention resides in the novel features of construction, formation, combination and arrangement of parts to be hereinafter more fully described, claimed and illustrated in the accompanying drawing, in which:—

Figure 1, is a fragmentary side elevation of a wheeled car truck and a portion of a track, showing the car replacer constructed in accordance with the invention and shown in normal position.

Fig. 2, is a view similar to Fig. 1, showing the car replacer in active position with the wheeled truck off of the track and being replaced thereon.

Fig. 3, is a fragmentary top plan view showing the car replacers in active position as illustrated in Fig. 2 with the front wheels of the car truck approaching the replacers for replacing the wheeled truck upon the track.

Fig. 4, is a perspective view of one of the jack blocks of the replacer.

Referring to the drawing in detail, A designates generally the body of a railway car which is of the ordinary well known construction having at each side of its bottom or base a longitudinal bed-sill 10 and this body is supported upon a wheeled truck 2, having journaled therein the usual flanged car wheels 3 which travel upon the rails B of the track and these rails are supported upon the railway bed through the medium of ordinary cross-ties C, which are arranged transversely beneath the rails B of the track on the bed thereof at the required intervals apart, as usual.

The car replacer comprises a plurality of jacking blocks 4, the same being arranged in companion pairs longitudinally of the rails B at the inner and outer sides thereof and are suspended in such pairs, each block being in the form of a rectangular shaped body having straight longitudinal side edges with right angular end edges and a flat bottom. At the forward or toe end of the body constituted by the block 4 and suitably fixed to the bottom face thereof or integral therewith is a riser or prop 5, which is formed with a laterally beveled tread or bottom surface 6, the beveled surface being directed inwardly toward the rail B adjacent thereto of the track so that when the body of the block 4 is resting upon the track bed it will incline or slope toward the rail adjacent thereto.

Each block 4 is formed at its heel end portion with a forwardly tapering inwardly curved rearwardly sloping cut away portion forming a guide-way or channel 7 which opens through the rear end of said block, the inner side edge thereof and the top face 8 of the same, the wider open end being extended through the rear end of the block while the smaller forward end merges into a slightly beveled corner edge 9 at the inner longitudinal side of the block and co-extensive therewith from the cut away portion 7 to the forward end of the block. The cut-away portion 7 will enable the car wheel 3 at the flanged periphery thereof to pass onto the block 4 and run upon the upper surface 8 and this wheel will be guided toward the rail B from the block and the flange of the wheel to travel upon the bevel edge 9 so that the car wheel will readily travel from the block 4 on to the rail of the track when the said block is in active position for replacing the wheel upon the track after the derailment of the car.

The inner and outer pairs of blocks 4 each is yieldably suspended or mounted upon the car body A and this is accomplished by mounting in the outer and inner side faces of each sill 10 spaced eye bolts 11 which are arranged the required distance apart in advance of the forward car wheel 3 in the truck 2 and connected to these eye bolts 11 are coiled retractile springs 12 which have their lower ends engaged in staples or other fasteners 13 mounted in the blocks 4. It is preferable to have a pair of springs 12 connected to the front or toe end of the block 4 on opposite sides thereof, while but a single spring 12 is connected near the heel end of said block 4 at the outer side thereof, so that this block is yieldably suspended or hung in the position shown in Fig. 1, of the drawing, slightly in advance of the forward wheels 3 of the truck 2 of the car, so that when the same becomes derailed, the plurality of blocks will be in parallelism with the rails B on opposite sides thereof, and in active position will be disposed upon the bed of the track at opposite sides of the rail B of said track to replace the car wheels upon the same.

On the car becoming derailed, the blocks 4 will contact with the bed of the track and as the car moves forwardly at a comparatively low speed of travel, the risers or props 6 of the blocks will be brought into engagement with one of the cross-ties C in advance of the truck of the car so that said blocks 4 will abut the said cross-tie, as is shown in Fig. 2 of the drawing, to be held stationary whereupon the wheels of the truck will travel upwardly upon the block at the side of the track of that on which the car is derailed as shown in Fig. 2, of the drawing, for the replacing of the car upon the track.

When the car moves upon the track, the springs 12 which have become tensioned on the abutment of the blocks 4 with the cross-ties and after the wheels 3, of the truck 2 of the car have passed off of the blocks said springs will exert an upward pull upon the blocks 4 causing the same to be tripped over the cross-tie against which the same abut and be lifted to assume normal position, as shown in Fig. 1, of the drawing.

Mounted upon the side sills 10 of the car body A are depending guide posts 14, which are properly positioned relative to the blocks 4, to prevent lateral shifting thereof when in normal position and these guide posts 14 are of a length sufficient to hold the blocks 4 against lateral displacement on the derailment of the car yet will permit the blocks 4 to pass beneath the lower free ends of the posts on the replacing of the car upon the track and when said car has been replaced, the blocks 4 after tripping the cross-tie against which the same have abut, said blocks can be reset relative to the guide posts by manually manipulating the same for replacing them in normal position for suspension, as shown in Fig. 1, of the drawing.

On the initial riding of the car truck wheels upon the blocks 4 in the cut away portion 7, the car wheels will be directed on to the rails B of the track before the wheels reach the forward or toe end portions of the block and in the active position of the blocks on the initial travel of the truck wheels thereon, the posts 14 will prevent lateral displacement of the blocks away from the adjacent rail so that there is no possibility of the flanges of the wheels dropping between the block and the rail before the wheeled truck becomes replaced upon the rails of the track.

From the foregoing it is thought that the construction and manner of use of the device will be clearly understood and therefore a more extended explanation has been omitted.

What is claimed is:—

1. The combination with a car, of a replacer yieldably supported thereby, and means carried by the car for engaging the replacer to prevent lateral movement thereof in one direction.

2. The combination with a car, of a replacer comprising a body, means for yieldably supporting the body by the car to hold the same normally in its inoperative position, said body having an inclined face at one end for engagement by the car wheels, an inclined surface carried by the upper surface of the body for laterally directing the wheels to the adjacent rail, and means carried by the car for engaging the body to prevent lateral movement thereof in one direction.

In testimony whereof, I affix my signature, in the presence of two witnesses.

WILLIAM J. BALLARD.

Witnesses:
F. H. MILLS,
B. D. DYSON.

Copies of this patent may be obtained for five cents each, by addressing the "Commissioner of Patents, Washington, D. C."